US006221998B1

(12) United States Patent
Okuhira et al.

(10) Patent No.: US 6,221,998 B1
(45) Date of Patent: Apr. 24, 2001

(54) ONE-PACK TYPE MOISTURE-CURABLE COMPOSITION

(75) Inventors: Hiroyuki Okuhira; Naoya Adachi, both of Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 09/424,501

(22) PCT Filed: Mar. 25, 1999

(86) PCT No.: PCT/JP99/01529

§ 371 Date: Nov. 24, 1999

§ 102(e) Date: Nov. 24, 1999

(87) PCT Pub. No.: WO99/50328

PCT Pub. Date: Oct. 7, 1999

(30) Foreign Application Priority Data

Mar. 25, 1998 (JP) .................................................. 10-077038
Jul. 9, 1998 (JP) .................................................. 10-194380
Dec. 17, 1998 (JP) .................................................. 10-358712
Feb. 25, 1999 (JP) .................................................. 11-048797

(51) Int. Cl.[7] .................................................... C08G 18/32
(52) U.S. Cl. .............................. 528/68; 528/61; 528/62; 528/64; 528/28; 528/73
(58) Field of Search .................................. 528/68, 73, 28

(56) References Cited

U.S. PATENT DOCUMENTS 4,694,043    9/1987   Fischer et al. ..................... 525/127
4,847,319 *  7/1989   Bandlish ........................... 524/589
4,937,293 *  6/1990   Blum et al. ...................... 525/327.6
5,130,402 *  7/1992   Akiyama et al. ................... 528/45
5,504,181 *  4/1996   Primeaux, II ...................... 528/60

FOREIGN PATENT DOCUMENTS 60-55022     3/1985   (JP) .
61-120862    6/1986   (JP) .
61-126177    6/1986   (JP) .
61-126178    6/1986   (JP) .
62-263216    11/1987  (JP) .
09031152     2/1997   (JP) .
09136939     5/1997   (JP) .

* cited by examiner

Primary Examiner—James J. Seidleck
Assistant Examiner—Melanie D. Bagwell
(74) Attorney, Agent, or Firm—Finnegan, Henderson, Farabow, Garrett & Dunner L.L.P.

(57) ABSTRACT

An isocyanate-based one-part moisture curable composition having excellent storage stability and high curing rate, and use of this composition enables production of a cured product of high flexibility without using any plasticizer. The composition comprises (A) an isocyanate compound having a structure wherein all of the isocyanate (NCO) groups in the molecule have secondary or tertiary carbon bonded thereto, and (B) a ketimine having ketimine (C=N) bond derived from a ketone or an aldehyde and an amine having a structure wherein α-position of at least one of the carbon or the nitrogen of the ketimine bond has a branched carbon atom or a ring member carbon atom bonded thereto. A urethane prepolymer having such structure is preferable for use as the isocyanate compound (A).

14 Claims, No Drawings

ONE-PACK TYPE MOISTURE-CURABLE COMPOSITION

TECHNICAL FIELD

This invention relates to a one-part moisture curable composition which has excellent storage stability and high curing rate once taken out of the container, and use of this composition enables production of a cured product of high flexibility without using any plasticizer. The one-part moisture curable composition of the present invention is useful as an adhesive or a sealant in the fields of coating, civil engineering and architecture.

BACKGROUND ART

An isocyanate compound is known to react with a curing agent such as an amine to form urethane bond, and a cured compound is readily formed by such reaction.

When such isocyanate compound is stored with an amine as a mixture, the mixture undergoes gelation, curing, and the like during the storage and the mixture was not at all storage stable. Therefore, the isocyanate compound has been generally used as a two-part composition, and the isocyanate compound and the curing agent were mixed in time of its use.

A curable composition in the form of a one-part curable composition has been awaited. The one-part curable compositions that are currently in use require use of a plasticizing agent such as dioctyl phthalate (DOP). The plasticizing agent, however, bleeds out after curing, and has raised a problem as environmental hormones. Of the room temperature-curable compositions, development of an isocyanate-based one-part curable composition is highly demanded since the flexibility of such composition is superior to that of the composition containing an epoxy compound as its main component.

Use of a blocked (capped) amine as a latent curing agent has been investigated for the purpose of solving the problems of odor and toxicity of the amine curing agents and improving the handling convenience. One technique known for such amine blocking is use of a ketimine which is an amine blocked with a ketone, and known ketimines include those synthesized from an alkylenediamine and a ketone such as methyl isobutyl ketone or methyl ethyl ketone. Ketimine is a compound stable in the absence of water. Ketimine, however, easily undergoes hydrolysis in the presence of water to become an active amine, and therefore, ketimine acts as a curing agent in the presence of moisture in the air.

However, use of such known universal ketimine for the latent curing agent of an isocyanate compound was associated with the problem of insufficient storage stability such as gelation during the storage of the mixture.

In addition, isocyanate compounds had insufficient adhesion to mortar and the like, and a tackifier such as an epoxy resin was often added to the isocyanate compound at the sacrifice of the flexibility.

In view of the situation as described above, there is a strong demand for a one-part, room temperature, moisture-curable composition which cures at an accelerated speed at room temperature by the moisture in the air, which exhibits improved adhesion to mortar and the like, and which cures into a flexible product even without using any plasticizer.

DISCLOSURE OF THE INVENTION

An object of the present invention is to provide an isocyanate-based one-part moisture curable composition which has excellent storage stability, which cures at a high rate once taken out of the container, and which cures into a highly flexible product without using any plasticizer.

Through investigation of the production of one-part moisture curable compositions containing an isocyanate compound, the inventors of the present invention found that a one-part isocyanate-based moisture curable composition having a high storage stability can be produced by using an isocyanate compound having a bulky group at α position of the isocyanate group and a ketimine having a bulky group at α position of the ketimine bond (C=N) for the latent curing agent; and that the thus produced composition also cures at a high speed to form a cured product having a high flexibility without using any plasticizer. The present invention has been completed on such findings.

In view of the situation as described above, the one-part moisture curable composition of the present invention comprises (A) an isocyanate compound having a structure wherein all of the isocyanate (NCO) groups in the molecule have secondary or tertiary carbon bonded thereto, and (B) a ketimine having ketimine (C=N) bond derived from a ketone or an aldehyde and an amine having a structure wherein α-position of at least one of the carbon or the nitrogen of the ketimine bond has a branched carbon atom or a ring member carbon atom bonded thereto.

The isocyanate compound (A) is represented, for example, by formula (1):

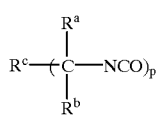

(1)

wherein $R^c$ and $R^a$ are independently an organic group which may contain O, S, or N; $R^b$ is hydrogen atom or said organic group; and p is an integer of at least 1.

The isocyanate compound (A) is preferably a polyisocyanate having two or more said isocyanate groups in the molecule.

Alternatively, the isocyanate compound (A) may be a urethane prepolymer derived from a polyisocyanate and a polyol.

The urethane prepolymer may be an adduct of said polyisocyanate and trimethylol propane.

Also, the urethane prepolymer may be a urethane prepolymer derived from said polyisocyanate and polypropylene glycol.

Also, the urethane prepolymer may be a urethane prepolymer derived from said polyisocyanate and a polyol having a bisphenol skeleton.

The ketimine (B) is preferably a ketimine wherein α-position of the ketimine carbon has a branched carbon atom or a ring member carbon atom bonded to. The branched carbon atom of the ketimine may be introduced from a ketone or an aldimine represented by formula (2):

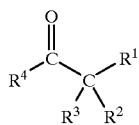

(2)

wherein
$R^1$ is a $C_{1-6}$ alkyl group;

$R^2$ is methyl group or ethyl group;

$R^3$ is hydrogen atom, methyl group, or ethyl group; and $R^4$ is hydrogen atom or methyl group.

In the ketimine wherein a branched carbon atom or a ring member carbon atom is bonded to the ketimine carbon, the ketimine nitrogen preferably has methylene group bonded thereto.

The ketimine (B) of such structure usually has two or more ketimine bonds in one molecule.

It is also preferable that the ketimine (B) is a silicon-containing ketimine or a polycondensate thereof wherein the ketimine carbon has a branched carbon atom or a ring member carbon atom bonded thereto, and wherein the ketimine contains an amine component derived from an aminoalkoxysilane represented by formula (4):

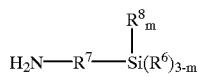

(4)

wherein $R^6$ is a $C_{1-6}$ alkyl group, a $C_{1-6}$ alkoxy group, or a monovalent siloxane derivative;

$R^7$ is a divalent hydrocarbon group which may contain nitrogen;

$R^8$ is an alkoxy group; and m is 1, 2 or 3.

Such ketimine (B) may further contains a group derived from an epoxy group-containing alkoxysilane, and have epoxy group and an alkoxysilyl group in one molecule.

The one-part moisture curable composition according to the present invention may further contain an epoxy resin.

BEST MODE FOR CARRYING OUT THE INVENTION

The present invention is hereinafter described in further detail.

The one-part moisture curable composition of the present invention comprises an isocyanate compound (A) of particular structure and a ketimine (B) of particular structure as described below.

First, such components contained in the moisture curable composition of the present invention are described.

(A) Isocyanate compound.

The isocyanate compound used in the present invention has a structure wherein all of the isocyanate (NCO) groups in the molecule have secondary or tertiary carbon bonded thereto. The groups other than the NCO group bonding to the secondary or the tertiary carbon are not limited, for example, in terms of the number of carbon atoms, bulkiness, inclusion of hetero atoms such as O, S and N, and the like. The two groups bonding to the tertiary carbon may be either the same or different from each other.

Such isocyanate compounds is typically represented by formula (1):

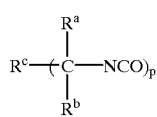

(1)

In the formula, $R^c$ and $R^a$ are independently an organic group which may contain O, S, or N; $R^b$ is hydrogen atom or said organic group; and p is an integer of at least 1.

Exemplary such organic groups include hydrocarbon groups such as an alkyl group, an alicyclic group, an aromatic group, an aralkyl group, and an alkylaryl group; and groups containing a hetero atom selected from O, S and N such as an organic group containing ether, carbonyl, amide, urea group (carbamide group), or urethane group.

Among such groups, the organic groups represented by $R^a$ and $R^b$ are preferably methyl.

P is preferably an integer of 2 to more. In other words, the isocyanate compound is preferably a polyfunctional isocyanate compound having two or more NCO groups having the branched carbon atom bonded thereto in one molecule. The monoisocyanate compound wherein p=1 is generally used as a mixture with the polyisocyanate wherein p is 2 to more. The polyisocyanate may be used either alone or in combination of two or more such compounds. Use of a diisocyanate (p=2) as a mixture with a triisocyanate (p=3) is a preferable embodiment.

The isocyanate compound used in the present invention may be any isocyanate compound as long as the isocyanate group has the structure as defined above, and may be an isocyanate monomer or a urethane prepolymer derived from a polyisocyanate monomer and a polyol.

Exemplary isocyanate monomers include a monoisocyanate compound (p=1) such as m- or p-isopropenyl-α, α dimethylbenzoyl isocyanate (TMI manufactured by Mitsui Sci-Tech); and a diisocyanate compound (p=2) such as m- or p-tetramethylxylilene diisocyanate (TMXDI) as shown by the formula:

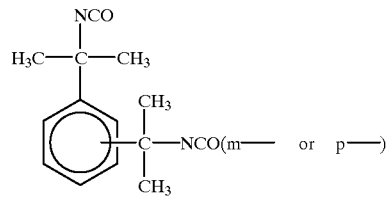

and isophorone diisocyanate.

Of the polyisocyanate monomers as described above, a diisocyanate is generally used for synthesizing the urethane prepolymer.

The polyol used for synthesizing the urethane prepolymer is not limited for its molecular weight or the type of the skeleton as long as it has two or more hydroxyl groups. Exemplary polyols which may be used in the present invention include low molecular weight polyhydric alcohols, polyether polyols, polyester polyols, polymeric polyols having a backbone comprising carbon-carbon bond, and the like which are commonly used as a polyol.

Exemplary urethane prepolymers include adducts of a diisocyanate and a low molecular weight polyhydric alcohol; and urethane prepolymers derived from a diisocyanate and a polyol such as a polyether polyol or a polyester polyol.

Exemplary such low molecular weight polyhydric alcohols include polyhydric alcohols such as ethylene glycol (EG), diethylene glycol, propylene glycol (PG), dipropylene glycol, (1,3- or 1,4-)butanediol, pentanediol, neopentylglycol, hexanediol, cyclohexanedimethanol, glycerine, 1,1,1-trimethylolpropane (TMP), 1,2,5-hexanetriol, and pentaerythritol; and sugars such as sorbitol.

Among the adducts of such polyhydric alcohol and a diisocyanate, the preferred is an adduct wherein trimethylolpropane (TMP) is used for the polyhydric alcohol (polyol) (the one wherein p=3 in the above formula). Exemplary preferable adduct is TMXDI.TMP adduct derived from 1,1,1-trimethylol propane (TMP) and tetramethylxylenediisocyanate (TMXDI) as shown below.

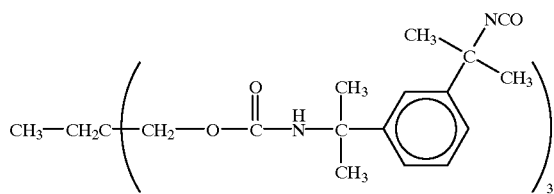

Such adduct is commercially available, for example, under the trade name of Scisen 3160 (Mitsui Sci-Tech).

Such adduct is not necessary a perfect OH:NCO adduct and may contain unreacted starting material.

The polyether polyol and the polyester polyol which are used as a polyol in the synthesis of the urethane prepolymer is generally derived from a low molecular weight polyhydric alcohol as described above. In the present invention, use of those derived from an aromatic diol is also preferable. Exemplary aromatic diols include dihydroxystyrene and those having a bisphenol skeleton such as bisphenol A structure (4,4'-dihydroxyphenylpropane), bisphenol F structure (4,4'-dihydroxyphenylmethane), brominated bisphenol A structure, hydrogenated bisphenol A structure, bisphenol S structure, or bisphenol AF structure.

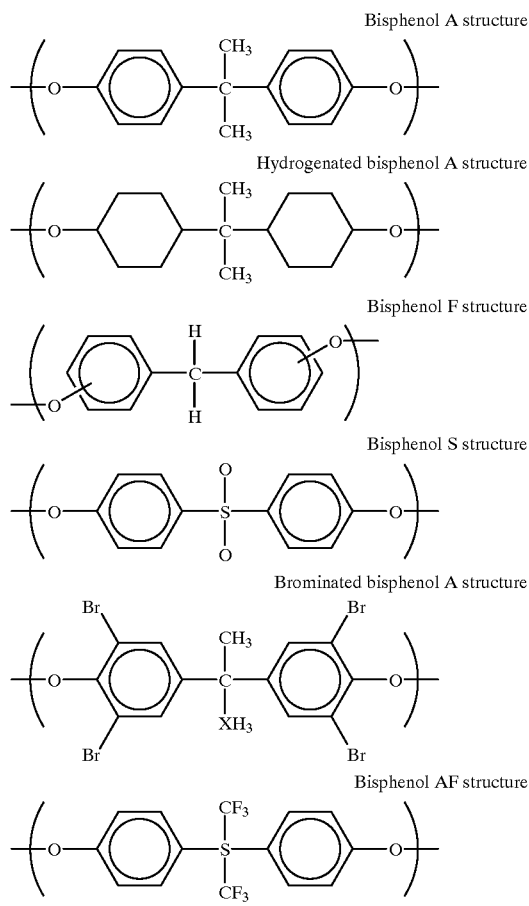

The polyether polyol used may be the one having one or more unit selected from units derived from an alkylene oxide such as ethylene oxide, propylene oxide, butylene oxide, tetramethylene oxide, and styrene oxide, and bisphenol skeletons. Such polyether polyol may be produced by ring-opening polymerization of a common alkylene oxide, and for example, by adding one or more alkylene oxides to one or more polyhydric alcohol and/or aromatic diol as described above.

Exemplary polyether polyols include polyethylene glycol, polypropylene glycol (PPG), ethylene oxide-propylene oxide copolymer, polytetramethylene ether glycol (PTMEG), sorbitol-based polyol, and the like.

Exemplary polyether polyols having a bisphenol skeleton include a polyether polyol produced from a diol having a bisphenol skeleton and an alkylene oxide such as the polyether polyol containing bisphenol A structure as mentioned above and a unit such as ethylene oxide or propylene oxide.

The polyester polyol may be a condensate (condensed polyester polyol) of one or more of polyhydric alcohols and/or aromatic diols as described above and one or more of polybasic carboxylic acid, lactone polyol, polycarbonate diol, and the like. The polybasic carboxylic acid used for forming the condensed polyester polyol include glutaric acid, adipic acid, azelaic acid, pimelic acid, suberic acid, sebasic acid, terephthalic acid, isophthalic acid, dimeric acid, and other low molecular weight carboxylic acid; oligomeric acid; castor oil; hydroxycarboxylic acid such as reaction product of castor oil with ethylene glycol, and the like. Exemplary lactone polyols include those prepared by ring-opening polymerization of propionlactone, valerolactone, and the like.

Exemplary polyester polyols having a bisphenol skeleton include condensed polyester polyols produced by totally or partly replacing the polyhydric alcohol with a diol having a bisphenol skeleton in the procedure as described above, for example, a polyester polyol produced from bisphenol A and castor oil, and a polyester polyol produced from bisphenol A, castor oil, ethylene glycol, and propylene glycol.

Polymer polyols having carbon-carbon bond in their backbone such as acryl polyol, polybutadiene polyol, hydrogenated polybutadiene polyol, and the like are also useful in the synthesis of the urethane prepolymer.

The polyols as described above may be used in combination of two or more.

Typical preferable urethane prepolymers are polyfunctional urehtane prepolymers produced by using, for example, a bifunctional or trifunctional polyol or a mixture thereof with a polyfunctional (OH) polypropylene glycol as a polyol.

Use of a urethane prepolymer having a bisphenol skeleton, and in particular, use of a urethane prepolymer having bisphenol A skeleton is also preferable. Exemplary such urethane prepolymers are those produced by using a polyester polyol synthesized from bisphenol A and castor oil, a polyether polyol synthesized from bisphenol A, ethylene oxide and propylene oxide for the polyol.

In the present invention, when a urethane prepolymer having a bisphenol skeleton as described above is used for the isocyanate compound (A), the resulting composition will exhibit improved adhesion to mortar and the like without adding any tackifier such as epoxy resin. As a consequence, the composition after curing will retain excellent flexibility inherent to the urethane-based resin compositions.

The urethane prepolymer may contain two or more polyol components. For example, urethane prepolymer may contain two or more polyol components each having different bisphenol skeletons, or a polyol component having a bisphenol skeleton together with another polyol component having a different structure.

Proportion in the urethane prepolymer of the part having the bisphenol skeleton is not particularly limited. The benefit as described above, however, can be realized when the urethane prepolymer contains 1 to 50% by mole of the part having the bisphenol skeleton.

The urethane prepolymer (B) as described above used in the present invention has weak intermolecular hydrogen bond due to the steric hindrance by the secondary or tertiary carbon bonding to the isocyanate (NCO) group, and therefore, appropriate viscosity and modulus are realized without using any plasticizer. The composition, of course, may include a plasticizer as desired.

In the present invention, the isocyanate compound (A) having the particular structure as described above may be used in combination of two or more. Furthermore, the isocyanate compound (A) of the present invention may be used with a small amount of other isocyanate compounds commonly used in the art as long as the benefits of the present invention are not impaired. For example, an isocyanate compound of the type used as the main component of the two-part curable composition which has a group that does not sterically hinder the isocyanate group may be employed in the present invention. Use of such isocyanate compound, however, should be limited to an amount of less than 10% by mole of the isocyanate compound (A) since such isocyanate compound adversely affects the storage stability of the composition.

(B) Ketimine

In the present invention, a compound having a C=N bond derived from a ketone or an aldehyde and an amine is referred to as a ketimine. Therefore, the term ketimine used herein includes an aldimine having —HC=N bond within its definition.

The ketimine used in the present invention has ketimine (C=N) bond derived from a ketone or an aldehyde and an amine, and has a structure wherein α-position of at least one of the carbon or the nitrogen of the ketimine bond has a branched carbon or a ring member carbon bonded thereto. In other words, the ketimine used in the present invention has a bulky group at the α-position of the ketimine (C=N) bond. The ring member carbon may be either the carbon atom constituting an aromatic ring or an alicyclic ring.

In the present invention, typical ketimines having such bulky group include:

(i) a ketimine having two or more ketimine (C=N) bonds each having the bulky group bonded thereto in one molecule; and (ii) a silicon-containing ketimine having a bulky group derived from a ketone or an aldehyde at the α-position of the ketimine carbon, and containing an amine component derived from an aminoalkylalkoxysilane, or its polycondensate.

For introducing the branched carbon or the ring member carbon in the α-position of the ketimine carbon in the above (i) and (ii), a ketone or an aldehyde which has a branched hydrocarbon group or a cyclic hydrocarbon group at the α-position of the carbonyl group is utilized. Examples of such ketones and aldehydes include diisopropyl ketone, a ketone or an aldehyde having the branched hydrocarbon group represented by the formula (2), below, a ketone and an aldehyde having a cyclic hydrocarbon group such as propiophenone, benzophenone, benzaldehyde, and cyclohexanecarboxyaldehyde. These may be used in combination.

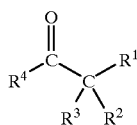

(2)

(wherein
R$^1$ is a C$_{1-6}$ alkyl group;

R$^2$ is methyl group or ethyl group;
R$^3$ is hydrogen atom, methyl group, or ethyl group; and
R$^4$ is hydrogen atom or methyl group.)

Exemplary ketones and aldehydes represented by formula (2), above include methyl t-butyl ketone (MTBK), methyl isopropyl ketone (MIBK), pivalic aldehyde (trimethylacetoaldehyde), isobutylaldehyde wherein the carbonyl group has branched carbon bonded thereto ((CH$_3$)$_2$CHCHO).

Among these, the preferred is the compound represented by formula (2).

The ketimine (i) has two or more C=N bond in one molecule. Such ketimine is generally produced by using a polyamine having two or more amino groups in one molecule. In the case of the ketimine wherein a bulky group is introduced at α position of the ketimine nitrogen as described above, the ketimine may be produced by using a polyamine such as 2,5-dimethyl-2,5-hexamethylenediamine, menthene diamine, 1,4-bis(2-amino-2-methylpropyl)piperadine, polypropylene glycol (PPG) wherein propylene branched carbons at opposite ends of the molecule has amino group bonded thereto (Jeffamine D230 and Jeffamine D400 manufactured by Sun Technochemical). Of the ketimines (i), use of a ketimine wherein the ketimine carbon has a bulky group bonded thereto and the ketimine nitrogen has methylene bonded thereto is preferable since the resulting one-part curable composition will exhibit both good storage stability and improved curabilty (curing rate) when used with the isocyanate compound (A) of the particular structure as described above.

Methylene group may be introduced in the ketimine nitrogen by using the polyamine represented by the formula (3):

R$^5$—(—CH$_2$—NH$_2$)$_n$         (3)

Exemplary polyamines represented by the formula (3) include ethylenediamine, propylenediamine, butylenediamine, diethylenetriamine, triethylenetetramine, tetraethylenepentamine, pentaethylenehexamine, hexamethylenediamine, trimethylhexamethylenediamine, N-aminoethylpiperadine, 1,2-diaminopropane, iminobispropylamine, methyliminobispropylamine, diamine having polyether skeleton wherein amine nitrogen has methylene group bonded thereto, for example, H$_2$N(CH$_2$CH$_2$O)$_2$(CH$_2$)$_2$NH$_2$ (trade name, Jeffamine EDR184, manufactured by Sun Technochemical), 1,5-diamino-2-methylpentane (trade name, MPMD, manufactured by DuPont Japan), metaxylenediamine (MXDA), polyamideamine (X2000, manufactured by Sanwa Chemical), isophoronediamine, 1,3-bisaminomethylcyclohexane (1,3BAC, manufactured by Mitsubishi Gas Chemical), 1-cyclohexylamino-3-aminopropane, 3-aminomethyl-3,3,5-trimethyl-cyclohexylamine, a diamine having norbornane skeleton (NBDA, manufactured by Mitsui Chemicals, Inc.).

Among these, the preferred are 1,3-bisaminomethylcyclohexane (1,3BAC), norbornane diamine (NBDA), metaxylylenediamine (MXDA), Jeffamine EDR184 (trade name), and polyamideamine.

Preferable examples of the ketimine (i) are:
ketimines produced from methyl isopropyl ketone (MIPK) or methyl t-butyl ketone (MTBK) and Jeffamine EDR148 (trade name, a dimethyleneamine having polyether skeleton);
ketimines produced from methyl isopropyl ketone (MIPK) or methyl t-butyl ketone (MTBK) and 1,3-bisaminomethylcyclohexane (1,3BAC);
ketimines produced from methyl isopropyl ketone (MIPK) or methyl t-butyl ketone (MTBK) and a diamine having norbornane skeleton (trade name, NBDA);

ketimines produced from methyl isopropyl ketone (MIPK) or methyl t-butyl ketone (MTBK) and metaxylylenediamine (MXDA); and ketimines produced from methyl isopropyl ketone (MIPK) or methyl t-butyl ketone (MTBK) and polyamideamine (trade name, X2000).

Among these, use of the ketimine produced from MIPK or MTBK and NBDA, and the ketimine produced from MIPK and 1,3BAC results in the improved curability of the resulting composition.

Use of the ketimine produced from MIPK or MTBK and X2000 results in the improved adhesion to wet surface of the resulting composition.

Preferable aldimines are those produced from the combination of pivalic aldehyde and norbornane diamine (NBDA), 1, 3-bisaminomethylcyclohexane (1,3BAC), Jeffamine EDR148 or metaxylylene diamine (MXDA); the combination of isobutyl aldehyde and norbornane diamine (NBDA), 1,3-bisaminomethylcyclohexane (1,3BAC), Jeffamine EDR148 or metaxylylene diamine (MXDA); and the combination of cyclohexane carboxy aldehyde and norbornane diamine (NBDA), 1,3-bisaminomethylcyclohexane (1,3BAC), Jeffamine EDR148 or metaxylylene diamine (MXDA). The ketimine (i) as described above may be produced by reacting the ketone or the aldehyde and the polyamine through heating under reflux in the absence of the solvent or in the presence of benzene, toluene, xylene or other solvent, and azeotropically removing the separated water.

Ketimine (ii) is a silicon-containing ketimine derived from the aminoalkoxysilane represented by formula (4), below. This ketimine, has a bulky group derived from the ketone or the aldehyde at the α position of the ketimine carbon, and the situation of this part is similar to the case of the ketimine (i).

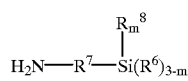

(4)

In formula (4), $R^6$ is $C_{1-6}$ alkyl group, $C_{1-6}$ alkoxy group, or a monovalent siloxane derivative. Exemplary $C_{1-6}$ alkyl groups include methyl group, ethyl group, propyl group, etc.; exemplary $C_{1-6}$ alkoxy groups include methoxy group, ethoxy group, propoxy group, etc.; and exemplary monovalent siloxane derivatives include silyloxy group. Among these, the preferred are methoxy and ethoxy groups.

$R^7$ is a divalent hydrocarbon group which may contain nitrogen, and $R^7$ preferably contains 1 to 6 carbon atoms. Exemplary divalent nitrogen-free hydrocarbon groups include methylene group, ethylene group, propylene group, etc.; and exemplary nitrogen-containing divalent hydrocarbon groups include those mentioned for the nitrogen-free hydrocarbon groups having a secondary amino group in their hydrocarbon group. Among these, it is preferred that the amino group in formula (4) has methylene group bonded thereto, and propylene group, and —$C_2H_4NHC_3H_6$— group are also preferred.

$R^8$ is an alkoxy preferably containing 1 to 6 carbon atoms, and more preferably, methoxy group or ethoxy group.

m is 1, 2 or 3.

Typical aminoalkoxysilanes represented by the formula (4) are the compounds of formulae (5) to (12), below. Among these, the preferred are the compounds of formulae (5) to (8). The compounds of formulae (5) to (8) are the compounds known as universal silane coupling agents.

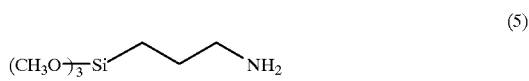
(5)
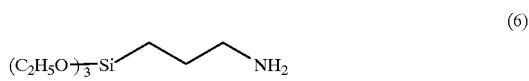
(6)
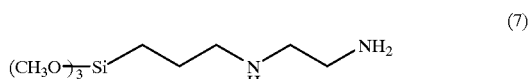
(7)
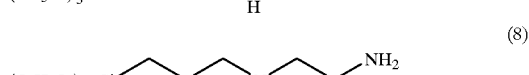
(8)
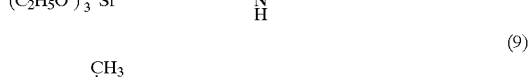
(9)
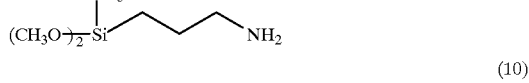
(10)
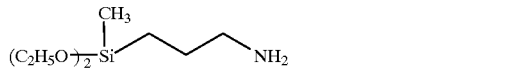
(11)
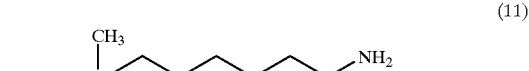
(12)
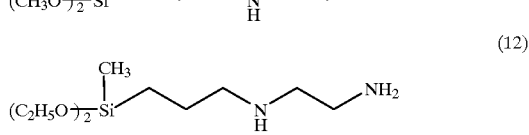

The aminoalkoxysilanes as described above is capable of readily forming the ketimine bond with the ketone or the aldehyde having a bulky group at the α-position of the carbonyl group, and the silicon-containing ketimine produced by using such aminoalkoxysilane is particularly preferable since such silicon-containing ketimine has high hydrolyzability and curability as well as sufficient storage stability.

The ketimine (ii) is produced from the aminoalkoxysilane and the ketone or the aldehyde having a bulky group as described above through dehydration. More illustratively, ketimine (ii) is produced by mixing the aminoalkoxysilane with an equal molar amount of the ketone or the aldehyde, or with an excessive amount of the ketone or the aldehyde (generally more than 1.2 equivalents of the ketone or the aldehyde in relation to the amino group), and stirring the mixture at a high temperature. The reaction temperature is 50 to 150° C., and preferably 70 to 110° C. The reaction period is 2 to 24 hours, and preferably 2 to 5 hours. The thus produced silicon-containing ketimine is represented by formula (13):

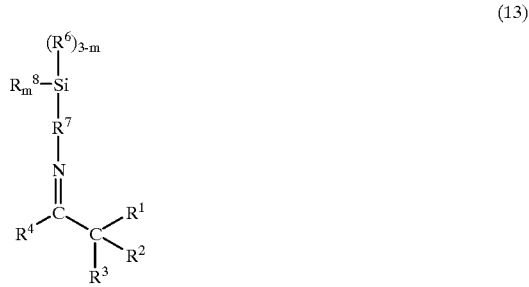

(13)

In formula (13), $R^1$ to $R^4$ are as defined above for $R^1$ to $R^4$ of the formula (2); and $R^6$, $R^7$, $R^8$, and m are as defined above for $R^6$, $R^7$, $R^8$, and m of the formula (4).

Alternatively, the ketimine (ii) may be a polycondensate of the silicon-containing ketimine as described above. Such polycondensate is formed by polymerization the alkoxysilyl group formed by hydrolysis of the silicon-containing ketimine of formula (13) by the water separated in the dehydration reaction between the aminoalkoxysilane and the ketone or the aldehyde. The polycondensate of the silicon-containing ketimine has a backbone of the structure as represented by formula (14):

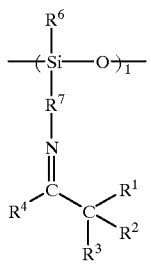

(14)

In the formula, $R^1$ to $R^4$, $R^6$ and $R^7$ are as defined above for $R^1$ to $R^4$, $R^6$ and $R^7$ of the formula (13); and n is an integer of at least 1, and preferably an integer of 1 to 50.

The backbone of the thus produced silicon-containing polymer may have at its terminals hydrogen atom; a $C_{1-6}$ alkyl group such as methyl group, ethyl group, or propyl group; a $C_{1-6}$ alkoxy group such as methoxy group, ethoxy group, or propoxy group; or a monovalent siloxane derivative such as silyloxy group.

The production of the silicon-containing ketimine (ii) by the reaction of the aminoalkoxysilane and the ketone or the aldehyde may be conducted in the co-presence of an alkoxysilane having no amino group. (The amino group-free alkoxysilane is hereinafter referred to as a silane coupling agent for the convenience of the description).

The silane coupling agent used may be any of the silane coupling agents known in the art, and typical silane coupling agents are epoxy-containing alkoxy silanes.

The epoxy-containing alkoxy silane may be a compound which has epoxy group and a hydrolyzable alkoxysilyl group on opposite terminals of the molecule. The backbone of the epoxy-containing alkoxysilane is an organic group which is mainly constituted from a hydrocarbon group such as methylene, ethylene, or the like and which also contains a group including O, S, or N.

The hydrolyzable alkoxysilyl group is a reactive silicon-based group wherein an alkoxy group such as methoxy group or ethoxy group is bonded to the silicon atom. The hydrolyzable alkoxysilyl group may also contain hydrogen atom or an alkyl group such as methyl group, ethyl group, or the like bonded to the silicon atom. Use of methoxy group for the alkoxy group is preferable in view of mild hydrolyzability and favorable handling convenience.

Among such epoxy-containing alkoxy silanes, the preferred is γ-(or 3-)glycidoxypropyltrimethoxysilane as shown below:

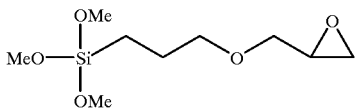

Also, the silane coupling agent may be the one containing no epoxy group. Exemplary such silane coupling agents include chloropropyltrimethoxysilane, vinyltrichlorosilane, trimethoxyvinylsilane, vinyltriethoxysilane, vinyltris(2-methoxyethoxy)silane, and γ-methacryloxypropyltrimethoxysilane. Among these, use of trimethoxyvinylsilane is preferred.

Use of such silane coupling agent is favorable in view of their excellent ability in improving the adhesion to wet surface and their general versatility.

It should be noted that, in the present invention, such silane coupling agent may be added in the synthesis of the ketimine (ii), or to the isocyanate (A) and the ketimine (B) in the after-mentioned production of the one-part curable composition. In either case, the amount of the silane coupling agent added is not particularly limited. The amount of the silane coupling agent, however, is preferably up to 5 molar amount, and preferably, up to 2 molar amount of the aminoalkoxysilane in view of the physical properties of the cured product.

The reaction conditions employed in the synthesis of the ketimine in the presence of the silane coupling agent as described above are the same as those employed in the absence of the silane coupling agent. After completion of the reaction, excess ketone or aldehyde and the alcohol generated are removed under reduced pressure to leave the desired product.

It is estimated that, in the reaction in the presence of the coupling agent, the silicon-containing ketimine is first generated through dehydration in the reaction between the aminoalkoxysilane and the ketone or the aldehyde, and then, the alkoxysilyl group in the silicon-containing ketimine and the alkoxysilyl group in the silane coupling agent react with each other after their hydrolysis by the separated water. Therefore, when an epoxy group-containing alkoxysilane is used for the silane coupling agent, the epoxy group remains unreacted in the reaction product together with the ketimine bond, and the resulting ketimine will contain epoxy group and alkoxysilyl group in the molecule as well as the ketimine bond.

These groups can coexist during the storage, and in the use, the presence of the epoxy group and the alkoxysilyl group in addition to the ketimine bond enables curing at a higher rate.

One of Typical ketimines (ii) produced by using such silicone coupling agent (epoxy group-containing alkoxysilane) is represented by formula (15):

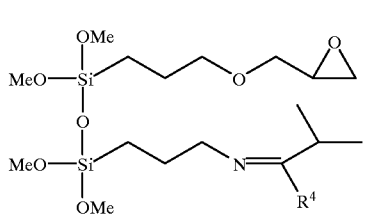

(15)

wherein $R^4$ is hydrogen or methyl group.

As described for the ketimines (i) and (ii), the ketimine used in the present invention has a structure wherein a bulky group is present at the α position of the ketimine bond, and the nitrogen is sterically hindered by such bulky group.

In the case of the conventional known ketimines produced from methyl isobutyl ketone (MIBK) or methyl ethyl ketone (MEK) and an amine having methylene group bonded to the amino group, the ketimine exhibited strong basicity since Ketimine nitrogen is exposed. Therefore, the one-part composition produced by blending such ketimine with the isocyanate compound suffered from insufficient storage stability and such composition often gelated during the storage.

In contrast, the ketimine used in the present invention has a bulky group near the ketimine nitrogen or a bulky group directly bonding to the ketimine nitrogen, and the ketimine nitrogen is protected by the substituent. As a consequence, the basicity of the ketimine is significantly weakened by the steric hindrance, and excellent stability is thereby realized. In addition, the ketimine nitrogen of the ketimine used in the present invention easily turns into active amine upon contact with the moisture in air in the use of the curable composition, and the composition exhibits excellent curability.

Even when the ketimine as described above is used for the latent curing agent, the resulting composition does not exhibit sufficient storage stability despite the high curing rate when the isocyanate compound used is an isocyanate group such as TDI (tolylene diisocyanate), XDI (xylene diisocyanate), or the like free from the bulky group near the isocyanate group. Accordingly, production of a one-part moisture curable composition with practical utility was difficult.

In contrast, the present invention has for the first time realized the one-part moisture curable composition by combining the ketimine of particular structure as described above with an isocyanate compound wherein the isocyanate group has a bulky group bonded thereto.

In the case of the isocyanate compound wherein the isocyanate group has a bulky group bonded thereto as used in the present invention, the isocyanate group is sterically hindered to a substantial degree, and when the bulky group is an electron donor such as an alkyl group, the isocyanate group exhibits low reactivity.

The blend (composition) comprising such isocyanate compound of particular structure and the ketimine of particular structure as described above remains stable during storage in a container.

On the other hand, when such composition is brought in contact with air, the ketimine nitrogen is easily attacked by the small-sized water molecule of the moisture since such small-sized molecule is not sterically hindered by the substituent. The attacked ketimine nitrogen rapidly undergoes hydrolysis, and therefore, the one-part moisture curable composition of the present invention cures in a quite short period.

In the production of the one-part moisture curable composition from the isocyanate compound (A) and the ketimine (B), the components are preferably used in amounts such that equivalent ratio of the functional groups in these components (isocyanate group in the isocyanate compound (A)/ketimine bond C=N in the ketimine (B)) is in the range of 0.1 to 2.0, and the equivalent ratio is more preferably in the range of 0.5 to 1.5. When the components are used at such ratio, the resulting composition exhibits both sufficient storage stability and excellent curability.

The one-part moisture curable composition of the present invention may contain optional components in addition to the component (A) and (B), if necessary. An exemplary such optional component is the silane coupling agent as described above.

Inclusion in the one-part moisture curable composition of a silane coupling agent will improve the adhesion to wet surface of the composition as well as the storage stability and the curing rate of the composition.

Among such silane coupling agents, the preferred are trimethoxyvinylsilane and γ-glycidoxypropyltrimethoxysilane in view of their excellent ability of improving the wet surface adhesion and their general versatility.

The silane coupling agent may be used in the synthesis of the ketimine (ii) as described above. However, when the silane coupling agent is used in the blending of the component (A) and (B), the silane coupling agent is preferably used in an amount of 0.1 to 20 parts by weight, and more preferably in an amount of 0.5 to 10 parts by weight per 100 parts by weight of the isocyanate compound (A). Use of the silane coupling agent in such amount will result in an improved adhesion to wet surface of the composition, and more illustratively, the composition after curing will exhibit high shear stress at break as well as percentage of matrix failure (adherend failure) of almost 100%.

The one-part moisture curable composition of the present invention may contain further optional components, if necessary, as long as such inclusion does not adversely affect the benefits of the present invention. For example, the composition may include a silyl ester group-containing compound as represented by formula (16):

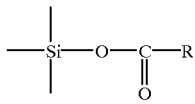

(16)

In the formula, R is hydrogen atom or a $C_{1-20}$ hydrocarbon group. Exemplary hydrocarbon groups include straight chain hydrocarbon groups such as methyl group, ethyl group, vinyl group, propyl group, octyl group, lauryl group, palmityl group, stearyl group, allyl group, eicosyl group, etc.; branched hydrocarbon groups such as isopropyl, isobutyl, etc.; alicyclic hydrocarbon groups such as hexamethyl; and aromatic groups such as phenyl, benzyl, etc.

R is preferably a $C_{1-17}$ hydrocarbon group in view of the ability to improve the storage stability and promote the curing reaction. When R is hydrogen atom, storage stability is not sufficiently improved, and hydrocarbon groups containing 18 or more carbon atoms are insufficient in promoting the curing reaction.

The silyl ester group-containing compound used in the present invention is not particularly limited as long as the compound has the silyl ester group represented by formula (16), and either one silyl ester group or two or more silyl ester groups may be included in the backbone, at the terminal of the backbone, or in the side chain. When two or more silyl ester groups represented by the formula (16) are present in one compound, the silyl ester groups may be either of the same type or different from each other. The backbone of such silyl ester group-containing compound mainly comprises Si—O bonds. The compound may include either one type or two or more types of the backbones. When the silyl ester group represented by formula (16) is present in the backbone, the Si of the silyl ester group constitutes Si of the backbone.

Exemplary silyl ester group-containing compounds include those represented by the following formulae:

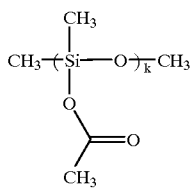

-continued

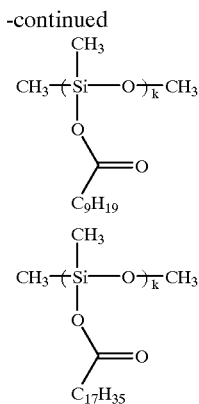

In the formulae, k represents the number of recurring silyl ester units.

The silyl ester group-containing compounds as described above may be produced, for example, by dehydration/condensation reaction between a polyhydrogen siloxane having Si—H group such as poly(methylhydrogen)siloxane and a carboxylic acid such as a straight chain saturated fatty acid such as formic acid and steric acid, an unsaturated fatty acid such as caproleic acid, an aromatic carboxylic acid such as benzoic acid, and an alicyclic acid such as naphthoic acid; or such reaction between a copolymer of the polyhydrogen siloxane as described above with an alken and the carboxylic acid as described above in the presence of a catalyst such as Pt, Ru or other Group VIII transition metal element in the form of a simple substance or a chloride thereof.

When the one-part moisture curable composition of the present invention contains the silyl ester group-containing compound as described above, curing time of the resulting composition will be reduced without detracting from the storage stability. To realize such benefits, the content of the silyl ester group-containing compound is preferably in the range of 0.05 to 10 parts by weight, and more preferably, 0.1 to 8 parts by weight per 100 parts by weight of the isocyanate compound (A).

The one-part moisture curable composition of the present invention may optionally contain calcium carbonate. In particular, addition of a surface-treated calcium carbonate is beneficial for realizing good initial thixotropy and storage stability.

Exemplary such calcium carbonate products include conventional known surface-treated calcium carbonate such as calcium carbonate surface treated with a fatty acid, a resin acid, or an ester of fatty acid. Typical calcium carbonate products surface treated with a fatty acid include Calfine 200 (manufactured by Maruo Calcium K.K.) and White-in 305 (heavy calcium carbonate, manufactured by Shiraishi Calcium). A typical calcium carbonate products surface treated with an ester of fatty acid include Sealet 200 (manufactured Maruo Calcium).

Calcium carbonate is preferably used in an amount of 30 to 200 parts by weight, and more preferably, in an amount of 50 to 150 parts by weight per 100 parts by weight of isocyanate compound (A) in order to realize an adequate initial thixotropy and sufficient workability. Calcium carbonate in excess of 200 parts by weight is likely to invite excessive increase in viscosity to detract from workability.

The one-part moisture curable composition of the present invention may also contain an epoxy resin. The type of the epoxy resin contained is not particularly limited as long as the epoxy resin used is a polyepoxy compound containing two or more epoxy groups in one molecule. Exemplary such epoxy resins include glycidyl ether epoxy resins of bisphenol A and derivatives thereof; glycidyl ether epoxy resins of glycerine; glycidyl ether epoxy resins of polyalkylene oxide; glycidyl ether epoxy resins of phenol novolac; glycidyl ester epoxy resins of dimeric acid and glycidyl ether epoxy resins of bisphenol F.

Among these, the preferred is glycidyl ester epoxy resin of bisphenol A.

Inclusion of the epoxy resin enables increase in the cure rate of the one-part moisture curable composition as well as improvement of the adhesion.

In the present invention, properties inherent to the urethane cured products such as flexibility, high compressive strength, high tensile strength, and the like are retained even when an epoxy resin is included in the composition in an amount more than the isocyanate compound (A). The amount of the epoxy resin added may be determined pursuantly as required by taking the curing rate of the resulting composition; hardness, compressive and tensile strength of the cured product; and the like into consideration.

In the present invention, polymers such as silicone polymers and modified silicone polymers may be used with the epoxy resin.

In addition, the one-part moisture curable composition of the present invention may optionally include a filler, a plasticizer, a thixotropic agent, a pigment, a dye, an antiaging agent, an antioxidant, an antistat, an flame retardant, a tackifier, a dispersant, a solvent, and the like.

The filler used may be an organic or inorganic filler of any configuration. Exemplary fillers include fumed silica, calcined silica, precipitated silica, pulverized silica, fused silica; diatomaceous earth; iron oxide, zinc oxide, titanium oxide, barium oxide, magnesium oxide; calcium carbonate, magnesium carbonate, zinc carbonate; talc clay, kaolin clay, calcined clay; carbon black; any of the foregoings treated with a fatty acid, a resin acid, or an ester of fatty acid.

The plasticizer used may be dioctyl phthalate (DOP), dibutyl phthalate (DBP); dioctyl adipate, isodecyl succinate; diethylene glycol dibenzoate, pentaerythritol ester; butyl oleate, methylacetyl ricinoleate; tricresyl phosphate, trioctyl phosphate; adipic acid propylene glycol polyester, adipic acid butyleneglycolpolyester; and the like.

The thixotropic agent used may be Aerosil (manufactured by Japan Aerosil K.K.), Disparon (manufactured by Kusumoto Kasei K.K.) or the like; and the antistatic agent may be quaternary ammonium salt, or a hydrophilic compound such as polyglycol, an ethylene oxide derivative, or the like.

The pigment used may be either or both of inorganic and organic pigments. Exemplary pigments include inorganic pigments such as titanium oxide, zinc oxide, ultramarine, red oxide, lithopone, lead, cadmium, iron, cobalt, aluminum, chloride, sulfate, and the like; and organic pigments such as azo pigments and copper phthalocyanine pigments.

A typical antiaging agent which may be used is a hindered phenol compound.

The antioxidant used may be butylhydroxytoluene (BHT), butylhydroxyanisole (BHA), or the like.

The flame retardant used may be any of chloroalkylphosphates, dimethyl methylphosphonate, bromine and phosphor compounds, ammonium polyphosphate, neopentylbiromide-polyether, brominated polyether, and the like.

The tackifier used may be terpene resin, phenol resin, terpene-phenol resin, rosin resin, xylene resin, or the like.

The additive components as described above may be used in an appropriate combination.

The method for producing the one-part moisture curable composition from the components as described above is not particularly limited. The composition, however, is preferably produced by thoroughly kneading and uniformly dispersing the components as described above in a mixer or other agitating means under reduced pressure or in an inert atmosphere such as nitrogen.

The resulting one-part moisture curable composition may be stored in a sealed container until its use whereupon the composition may be taken out of the sealed container for curing by the moisture in air at normal temperature.

EXAMPLES

The present invention is further described by referring to the Examples which by no means limit the scope of the invention.

<Synthesis of Ketimine or Aldimine>

Synthesis Example 1

Synthesis of Ketimine A 100 g of m-xylylenediamine (MXDA, manufactured by Mitsubishi Gas Chemical Company, Inc.) as an amine and 216 g of methyl t-butyl ketone (MTBK) corresponding to 1.5 equivalents of the amine were added to a flask with 200 g of toluene. The reaction was continued for 20 hours and the water generated was azeotropically removed to obtain ketimine A (a yellow transparent liquid; yield, 211 g; percent yield, 96%).

Synthesis Example 2

Synthesis of Ketimine B

The procedure of Synthesis Example 1 was repeated except that 100 g of a diamine having polyether skeleton as shown below (Jeffamine EDR148, manufactured by Sun Technochemical Inc.) as an amine and 200 g of methyl t-butyl ketone (MTBK) were used. After 20 hours, there was obtained ketimine B (a yellow transparent liquid; yield, 202 g; percent yield, 96%).

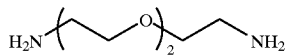

Jeffamine EDR148

Comparative Synthesis Example 3

Synthesis of Ketimine C

The procedure of Synthesis Example 1 was repeated except that 216 g of methyl isobutyl ketone (MIBK) was used as a ketone. After 20 hours, there was obtained ketimine C (a yellow transparent liquid; yield, 216 g; percent yield, 98%).

Synthesis Example 4

Synthesis of Ketimine D 200 g of γ-glycidoxypropyltrimethoxysilane (A187, manufactured by Japan Uniker), 152 g of γ-aminopropyltrimethoxysilane (A1110, manufactured by Japan Uniker), and 200 g of methyl isopropyl ketone (MIPK) were placed in a flask, and stirred at 110° C. for 4 hours. Excess methyl isopropyl ketone and methanol were removed to obtain ketimine D (a yellow transparent liquid; yield, 281 g; percent yield, 99%).

Synthesis Example 5

Synthesis of Ketimine E

The procedure of Synthesis Example 4 was repeated except that methyl isopropyl ketone (MIPK) was replaced 200 g of methyl t-butyl ketone (MTBK) to obtained ketimine E (a yellow transparent liquid; yield, 293 g; percent yield, 99%).

Synthesis Example 6

Synthesis of Ketimine F

The procedure of Synthesis Example 1 was repeated except that 100 g of a diamine having norbornane skeleton as shown below (NBDA, manufactured by Mitsui Chemicals, Inc.) as an amine and 200 g of methyl isobutyl ketone (MIBK) as a ketone were used. After 20 hours, there was obtained ketimine F (a yellow transparent liquid; yield, 184 g; percent yield, 98%).

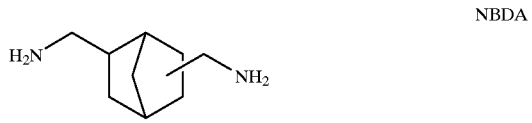

NBDA

Synthesis Example 7

Synthesis of Ketimine G

The procedure of Synthesis Example 1 was repeated except that 100 g of the diamine having polyether skeleton as described above (Jeffamine EDR148, manufactured by Sun Technochemical Inc.) as an amine and 189 g of methyl isopropyl ketone (MIPK) as a ketone were used. After 20 hours, there was obtained ketimine G (a yellow transparent liquid; yield, 188 g; percent yield, 98%).

Synthesis Example 8

Synthesis of Ketimine H

The procedure of Synthesis Example 1 was repeated except that 100 g of a diamine having propylene glycol skeleton as shown below (Jeffamine D230, manufactured by Sun Technochemical Inc.) as an amine and 130 g of methyl isobutyl ketone (MIBK) as a ketone were used. After 20 hours, there was obtained ketimine H (a yellow transparent liquid; yield, 167 g; percent yield, 98%).

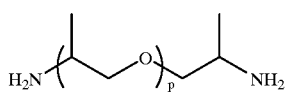

Synthesis Example 9

Synthesis of aldimine A 100 g of the diamine having norbornane skeleton as described above (NBDA, manufactured by Mitsui Chemicals, Inc.) and 200 g of toluene were mixed, and 140 g of isobutyl aldehyde was slowly added dropwise to this mixture.

After completing the dropwise addition, the mixture was stirred at room temperature for 2 hours, and refluxed at 140° C. for 5 hours.

After completion of the reaction, toluene and excess isobutyl aldehyde were removed at a reduced pressure to obtain the desired aldimine A (a colorless transparent liquid; yield, 165.4 g; percent yield, 98%).

Synthesis Example 10

Synthesis of Aldimine B 100 g of 1,3-bisaminomethylcyclohexane (1,3 BAC) and 200 g of toluene were mixed, and 130 g of isobutyl aldehyde was slowly added dropwise to this mixture.

After completing the dropwise addition, the mixture was stirred at room temperature for 2 hours, and refluxed at 140° C. for 5 hours.

After completion of the reaction, toluene and excess isobutyl aldehyde were removed at a reduced pressure to obtain the desired aldimine B (a colorless transparent liquid; yield, 172.5 g; percent yield, 98%).

Synthesis Example 11

Synthesis of Aldimine C 100 g of norbornane diamine (NBDA) and 200 g of toluene were mixed, and 150 g of pivalic aldehyde was slowly added dropwise to this mixture.

After completing the dropwise addition, the mixture was stirred at room temperature for 2 hours, and refluxed at 140° C. for 5 hours.

After completion of the reaction, toluene and excess isobutyl aldehyde were removed at a reduced pressure to <Viscosity Increase>

The components (A) and (B) were mixed in a sealed container and stored at 20° C. for one day, and then at 70° C. for another one day. The viscosity value after the two day storage was divided by the viscosity value after the one day storage at 20° C.

Comparative Example 1

Compositions were produced by mixing the isocyanate compound shown in Table 1 and the ketimine produced as described above at the mixing ratio shown in Table 1. The compositions were evaluated as in the case of Example 1. The results are shown in Table 1.

TABLE 1

|  |  |  |  | Example I |  |  |  | Comparative Example 1 |  |  |
|---|---|---|---|---|---|---|---|---|---|---|
|  |  |  | 1-1 | 1-2 | 1-3 | 1-4 | 1-5 | 1-1 | 1-2 | 1-3 |
| (A) Isocianate | TMXDI (tetramethylxylene diisocyanate) *1 |  | 100 | 100 |  |  | 100 |  |  |  |
|  | TMXDI · TMP adduct *2 (Scisen 3160) |  |  |  | 100 | 100 |  |  |  |  |
|  | TDI (tolylene diisocyanate) |  |  |  |  |  |  | 100 | 100 |  |
|  | XDI (xylene diisocyanate) |  |  |  |  |  |  |  |  | 100 |
| (B) Ketimine | Keton | Amine and other components |  |  |  |  |  |  |  |  |
|  | Ketimine A  MTBK | MXDA | 10 |  |  |  |  |  |  | 10 |
|  | Ketimine B | Jeffamine EDR 148 |  | 10 | 10 |  |  | 10 |  |  |
|  | Ketimine D  MIPK | γ-aminopropyltrimethoxysilane |  |  |  | 20 |  |  |  |  |
|  | Ketimine E  MTBK | γ-glycidoxypropyltrimethoxysilane |  |  |  |  | 20 |  |  |  |
|  | Ketimine C  MIBK | MXDA |  |  |  |  |  |  | 10 |  |
| Tack-free time (hr) |  |  | 6 | 10 | 6 | 4 | 5 | 4 | 3 | 6 |
| Viscosity increase (ratio) |  |  | 3 | 2 | 3 | 2 | 1.2 | Cured | Cured | Cured |

Amount of the compounds in the Table are represented in parts by weight.
*1 TMXDI (manufactured by Mitsui Sci-Tech)

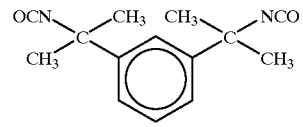

*2 TMXDI · TMP adduct (Scisen 3160, manufactured by Mitsui Sci-Tech)

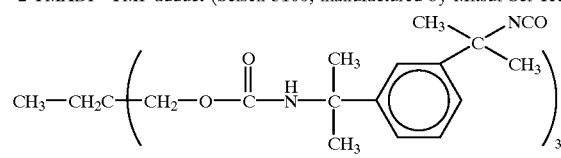

obtain the desired aldimine C (a colorless transparent liquid; yield, 184.5 g; percent yield, 98%).

Example 1

Compositions produced by mixing the ketimine produced as described above and the isocyanate compound shown in Table 1 at the mixing ratio shown in Table 1 were evaluated for their curability (tack free time) and storage stability (percentage of viscosity increase) as described below. The results are shown in Table 1.
<Tack-free Time>

The components (A) and (B) were mixed and kept under the conditions of 20° C. and humidity of 55%. The time required for the mixture to become tack-free was measured by attaching a polyethylene film to the surface of the mixture.

Example 2

Compositions were produced by mixing ketimine F or ketimine G as described above; the isocyanate compound A or B as described above; epoxy resin (ELA 128, manufactured by Sumitomo Chemical Co., Ltd.), and calcium carbonate (Calfine 200, manufactured by Maruo Calcium) at the mixing ratio shown in Table 2 The compositions were evaluated for their tack-free time and viscosity increase as in the case of Example 1. The results are shown in Table 2.

Reference Example 2

The procedure of Example 2 was repeated except that 5 parts by weight of the isocyanate compound was substituted with the epoxy resin and no isocyanate compound was used. The compositions produced were evaluated for their tack-free time and viscosity increase as in the case of Example 1. The results are shown in Table 2.

tin catalyst at 70° C. for 15 hours to produce urethane prepolymer (4).

TABLE 2

|  | Example 2 | | | Reference |
|---|---|---|---|---|
|  | 2-1 | 2-2 | 2-3 | Example |
| (A) TMXDI (tetramethylxylenediisocyanate) | 5 | 30 | | |
| TMXDI · TMP adduct (Scisen 3160) | | | 5 | |
| Epoxy resin | 95 | 70 | 95 | 100 |
| (B) Keton Amine | | | | |
| Ketimine F (MIPK, NBDA) | 38 | 38 | | 38 |
| Ketimine G (MIPK, Jeffamine EDR 148) | | | 40 | |
| Calcium carbonate | 100 | 100 | 100 | 100 |
| Tack-free time (hr) | 1.5 | 1.2 | 1.3 | 1.8 |
| Viscosity increase (ratio) | 1.1 | 1.1 | 1.1 | 1.1 |

Amount of the compounds in the Table are represented in parts by weight.

<Synthesis of Isocyanate Compound (Urethane Prepolymer)>

(1) Synthesis of Bifunctional Urethane Polymer

Tetramethylxylene diisocyanate (TMXDI, manufactured by Mitsui Sci-Tech) and bifunctional polypropylene glycol (PPG) (Exenol 3020, manufactured by Asahi Glass Co., Ltd., molecular weight, 3000) as a diol were mixed at a molar ratio of NCO/OH of 1.8, and the reaction was allowed to take place in the presence of a tin catalyst at 80° C. for 8 hours with stirring to produce urethane prepolymer (1). The urethane prepolymer (1) had an initial viscosity as shown in Table 3.

(2) Synthesis of Trifunctional Urethane Prepolymer

TMXDI as described above and trifunctional PPG (Exenol 5030, manufactured by Asahi Glass Co., Ltd., molecular weight, 5000) as a triol were mixed at a molar ratio of NCO/OH of 2.0, and the reaction was allowed to take place in the presence of a tin catalyst at 80° C. for 8 hours with stirring to produce urethane prepolymer (2). The urethane prepolymer (2) had an initial viscosity as shown in Table 3.

(3) Synthesis of TDI Urethane Prepolymer

A 1:1 (weight ratio) polyol mixture of a diol (Exenol 3020) and a triol (Exenol 5030) as described above was mixed with TDI (tolylene diisocyanate) at a molar ratio of NCO/OH of 2.0, and the reaction was allowed to take place in the presence of a tin catalyst at 80° C. for 8 hours with stirring to produce urethane prepolymer (3). The urethane prepolymer (3) had an initial viscosity as shown in Table 3.

(4) Synthesis of Urethane Prepolymer Having BPA Skeleton

TMXDI as described above and a polyol having bisphenol A (BPA) skeleton (URIC AC-003, manufactured by Ito Seiyu) were mixed at a molar ratio of NCO/OH of 2.0, and the reaction was allowed to take place in the presence of a (5) Synthesis of Urethane Prepolymer Having PPG Skeleton The procedure of synthesizing urethane prepolymer (2) was repeated except that the reaction was allowed to take place at a reaction temperature of 70° C. for a reaction period of 15 hours to thereby produce urethane prepolymer (5).

(6) Synthesis of Urethane Prepolymer Having BPA Skeleton

The procedure of synthesizing urethane prepolymer (4) was repeated except that TMXDI was replaced with m-phenylene diisocyanate (MPheDI) to thereby produce urethane prepolymer (6).

(7) Synthesis of Urethane Prepolymer Having PPG Skeleton

The procedure of synthesizing urethane prepolymer (5) was repeated except that TMXDI was replaced with m-phenylene diisocyanate (MPheDI) to thereby produce urethane prepolymer (7).

Example 3

Resin compositions were produced by mixing the urethane prepolymer (1) and/or (2) prepared as an isocyanate compound; ketimine or aldimine shown in Table 3; and calcium carbonate (the same as the one used in Example 2) at the mixing ratio shown in Table 3. The compositions were evaluated for their tack-free time and viscosity increase as in the case of Example 1. The results are shown in Table 3.

Comparative Example 3

Resin compositions were produced by mixing the TDI urethane prepolymer (3) prepared as an isocyanate compound; and dioctyl phthalate (DOP) as a plasticizer and calcium carbonate (the same as the one used in Example 2) at the mixing ratio shown in Table 3. The compositions were evaluated for their tack-free time and viscosity increase as in the case of Example 1. The results are shown in Table 3.

TABLE 3

|  |  | Example 3 | | | | | | Comparative Example 3 | |
|---|---|---|---|---|---|---|---|---|---|
|  |  | 3-1 | 3-2 | 3-3 | 3-4 | 3-5 | 3-6 | 3-1 | 3-2 |
| (A) Isocianate | Bifunctional urethane prepolymer (1) (PPG · TMXDI prepolymer) (Initial viscosity, 15.9 Pa · s) | 20 | | | | | | | |
|  | Trifunctional urethane prepolymer (2) (PPG · TMXDI prepolymer) | 80 | 100 | 100 | 100 | 100 | 100 | | |

TABLE 3-continued

|  |  | Example 3 3-1 | 3-2 | 3-3 | 3-4 | 3-5 | 3-6 | Comparative Example 3 3-1 | 3-2 |
|---|---|---|---|---|---|---|---|---|---|
|  | (Initial viscosity, 52.3 Pa · s) TDI urethane prepolymer (PPG · TDI prepolymer) (Initial viscosity, 138 Pa · s) |  |  |  |  |  |  | 100 | 100 |
| (B) Ketimine | Ketimine F (MIPK, NBDA) | 6.5 | 6.8 |  |  |  |  |  |  |
|  | Ketimine H (NIBK, Jeffamine D230) |  |  | 9.2 |  |  |  |  |  |
|  | Aldimine A (isobutyl aldehyde, NBDA) |  |  |  | 6.2 |  |  |  |  |
|  | Aldimine B (isobutyl aldehyde, 1,3-BAC) |  |  |  |  | 5.8 |  |  |  |
|  | Aldimine C (pyvalic aldehyde, NBDA) |  |  |  |  |  | 6.5 |  |  |
| Calcium carbonate |  | 100 | 100 | 100 | 100 | 100 | 100 | 50 | 100 |
| DOP |  |  |  |  |  |  |  |  | 40 |
| Tack-free time (hr) |  | 1.8 | 1.5 | 1.6 | 1.8 | 1.5 | 1.6 | 6–8 | 6–8 |
| Viscosity increase (ratio) |  | 1.1 | 1.1 | 1.1 | 1.1 | 1.1 | 1.1 | 3.0 | 1.1 |

Amount of the compounds in the Table are represented in parts by weight.

As shown in the Table, above, the isocyanate compound of the Example (urethane prepolymer) having the structure defined by the present invention has a low initial viscosity, and the desired modulus (initial viscosity) is realized without using any plasticizer. Accordingly, no plasticizer is particularly required for modulus adjustment.

In contrast, the isocyanate compound of the Comparative Example (TDI urethane prepolymer) outside the scope of the present invention cures without using any ketimine. The composition, however, exhibits high initial viscosity, and a plasticizer is required for modulus adjustment.

In addition, foaming by carbon dioxide was observed in the curing of Comparative Example 3, while no such foaming was observed in Example 3.

Example 4

In the Example of Example 2 employing ketimine F, TMXDI used as an isocyanate compound was replaced with the urethane prepolymer shown in Table 4, and the components were used in the amount shown in Table 4. The resulting resin compositions were evaluated for their viscosity increase and tack-free time as in the case of Example 1. The compositions were also evaluated for the elongation of the cured products and adhesion to slate plate (shear strength and mode of breakage) as described below. The results are shown in Table 3.

Comparative Example 4

The procedure of Example 4-1 was repeated by replacing the isocyanate compound with the urethane prepolymer (6) prepared as described above (Comparative Example 4–1), and by replacing the isocyanate compound with the urethane prepolymer (7) prepared as described above and without adding any ketimine (Comparative Example 4–2). The compositions were evaluated as in the case of Example 4. The results are shown in Table 4.

Referential Example

The epoxy resin composition of Referential Example shown in Table 2 was evaluated as in the case of Example 4. The results are shown in Table 4.

<Elongation of the Sheet>

The resin compositions were allowed to cure at 20° C. and at a RH of 55% for 10 days, and a dumbbell-shaped No. 2 test specimen defined in JIS K6251 was stamped from the cured sheet. The test specimen was stretched at a tensile speed of 200 mm/min to measure the elongation at break.

<Shear Strength>

The adhesive was sandwiched at 50 mg/cm$^2$ between two slate plates, and allowed to cure at 20° C. and at a RH of 55% for 10 days. The cured adhesives were evaluated for their strength at breakage in shear test at an acceleration rate of 3 MPa/min.

<Mode of Breakage>

The case in the shear test where the slate plate underwent breakage is indicated as "adherend failure" and the case where the slate plate was peeled at the interface between the slate plate and the adhesive is indicated as "interfacial peeling".

TABLE 4

|  | Example 4 4-1 | 4-2 | 4-3 | Comparative Example 4 4-1 | 4-2 | Referential Example |
|---|---|---|---|---|---|---|
| (A) Isocianate compound |  |  |  |  |  |  |
| Urethane prepolymer (4) (BPA-TMXDI) | 100 | 50 |  |  |  |  |
| Urethane prepolymer (5) (PPG-TMXDI) |  |  | 30 |  |  |  |
| Urethane prepolymer (6) (BPA-MPhDI) |  |  |  | 100 |  |  |
| Urethane prepolymer (7) |  |  |  |  | 100 |  |

TABLE 4-continued

|  | Example 4 | | | Comparative Example 4 | | Referential Example |
| --- | --- | --- | --- | --- | --- | --- |
|  | 4-1 | 4-2 | 4-3 | 4-1 | 4-2 |  |
| (PPG-MPhDI) |  |  |  |  |  |  |
| Epoxy resin |  | 50 | 70 |  |  | 100 |
| (B) Ketimine F | 23 | 31 | 30 | 23 |  | 38 |
| Calcium carbonate | 100 | 100 | 100 | 100 | 100 | 100 |
| Tack-free time (hr) | 1.0 | 3.0 | 4.0 | 1.0 | 1.8 | 8.0 |
| Viscosity increase (ratio) | 1.2 | 1.3 | 1.2 | Gelation | 1.2 | 1.1 |
| Sheet elongation (%) | 115 | 50 | 20 | 90 | 600 | 5 |
| Adhesion to slate plate |  |  |  |  |  |  |
| Shear strength (Mpa) | 3 | 3 | 3 | 3 | 1.3 | 3 |
| Mode of breakage | adherend failure | adherend failure | adherend failure | adherend failure | interfacial peeling | adherend failure |

Amount of the compounds in the Table are represented in parts by weight.

As demonstrated above, the resin composition (Example 4-1) containing the isocyanate compound having the structure defined by the present invention (urethane prepolymer having bisphenol A skeleton) exhibits good elongation after curing as well as excellent adhesion to mortar (slate plate) and the like. This resin composition has a flexibility markedly superior to the epoxy resin composition (Reference Example), and the good flexibility of this resin composition was maintained in the resin composition having epoxy resin added thereto (Example 4-2).

In contrast, in the case of the compositions containing the isocyanate compound (urethane prepolymer) outside the scope of the present invention, the composition suffered from insufficient storage stability even if when the urethane prepolymer had bisphenol A structure (Comparative Example 4-1) and the composition suffered from inferior adhesion to mortar and the like even when the prepolymer had PPG skeleton (Comparative Example 4-2).

INDUSTRIAL APPLICABILITY OF THE INVENTION

As demonstrated above, the one-part moisture curable composition according to the present invention has an excellent storage stability and a high curing rate once taken out of the container, and use of such composition enables production of a cured product of high flexibility even without using any plasticizer.

The one-part moisture curable composition of the present invention is useful as an adhesive or a sealant of concrete, wood, metal and the like.

What is claimed is:

1. A one-part moisture curable composition comprising:

(A) an isocyanate compound having a free isocyanate (NCO)-terminated structure wherein all of the isocyanate (NCO) groups in the molecule have secondary or tertiary carbon bonded thereto, and (B) a ketimine having ketimine (C=N) bond derived from a ketone or an aldehyde and an amine having a structure wherein α-position of at least one of the carbon or the nitrogen of the ketimine bond has a branched carbon atom or a ring member carbon atom bonded thereto.

2. A one-part moisture curable composition according to claim 1, wherein said isocyanate compound (A) is represented by formula (1):

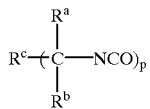

(1)

wherein $R^c$ and $R^a$ are independently an organic group which may optionally contain O, S, or N; $R^b$ is hydrogen atom or said organic group; and p is an integer of at least 1.

3. A one-part moisture curable composition according to claim 1 wherein said isocyanate compound (A) is a polyisocyanate having two or more said isocyanate groups in the molecule.

4. A one-part moisture curable composition according to claim 3 wherein said isocyanate compound (A) is a urethane prepolymer derived from said polyisocyanate and a polyol.

5. A one-part moisture curable composition according to claim 4 wherein said urethane prepolymer is an adduct of said polyisocyanate and trimethylol propane.

6. A one-part moisture curable composition according to claim 4 wherein said urethane prepolymer is a urethane prepolymer derived from said polyisocyanate and polypropylene glycol.

7. A one-part moisture curable composition according to claim 4 wherein said urethane prepolymer is a urethane prepolymer derived from said polyisocyanate and a polyol having a bisphenol skeleton.

8. A one-part moisture curable composition according to claim 1 wherein, in said ketimine (B), said branched carbon atom or said ring member carbon atom is bonded to the ketimine carbon.

9. A one-part moisture curable composition according to claim 8 wherein said ketimine (B) is the one produced from a ketone or an aldehyde represented by formula (2):

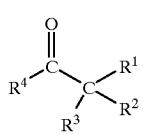

(2)

wherein $R^1$ is a $C_{1-6}$ alkyl group;

$R^2$ is methyl group or ethyl group;

$R^3$ is hydrogen atom, methyl group, or ethyl group; and $R^4$ is hydrogen atom or methyl group.

10. A one-part moisture curable composition according to claim 8 wherein methylene group is bonded to the ketimine nitrogen.

11. A one-part moisture curable composition according to claim 8 wherein said ketimine (B) has two or more ketimine bonds in one molecule.

12. A one-part moisture curable composition according to claim 1 wherein said ketimine (B) is a silicon-containing ketimine or a polycondensate thereof, containing an amine component derived from an aminoalkoxysilane represented by formula (4):

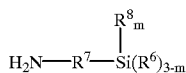

(4)

(wherein $R^6$ is a $C_{1-6}$ alkyl group, a $C_{1-6}$ alkoxy group, or a monovalent siloxane derivative; $R^7$ is a divalent hydrocarbon group which may optionally contain nitrogen; $R^8$ is an alkoxy group; and m is 1, 2 or 3.).

13. A one-part moisture curable composition according to claim 12 wherein said ketimine (B) further contains a group derived from an epoxy group-containing alkoxysilane; and has epoxy group and an alkoxysilyl group in one molecule.

14. A one-part moisture curable composition according to claim 1 further containing an epoxy resin.

* * * * *